(12) United States Patent
Forgang et al.

(10) Patent No.: US 7,804,302 B2
(45) Date of Patent: *Sep. 28, 2010

(54) METHOD AND APPARATUS FOR ENHANCING FORMATION RESISTIVITY IMAGES OBTAINED WITH DOWNHOLE GALVANIC TOOLS

(75) Inventors: Stanislav W. Forgang, Houston, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 845 days.

This patent is subject to a terminal disclaimer.

(21) Appl. No.: 11/201,251

(22) Filed: Aug. 10, 2005

(65) Prior Publication Data

US 2007/0035306 A1    Feb. 15, 2007

(51) Int. Cl.
*G01V 3/00* (2006.01)
*G01V 3/08* (2006.01)

(52) U.S. Cl. ...................... 324/358; 324/347
(58) Field of Classification Search .......... 324/338–358
See application file for complete search history.

(56) References Cited

U.S. PATENT DOCUMENTS

| | | | |
|---|---|---|---|
| 2,930,969 A | 3/1960 | Baker | 324/10 |
| 4,282,486 A * | 8/1981 | Culver et al. | 324/371 |
| 4,403,290 A * | 9/1983 | Clavier et al. | 702/13 |
| 4,463,378 A | 7/1984 | Rambow | 358/112 |
| 4,468,623 A | 8/1984 | Gianzero et al. | 324/367 |
| 5,502,686 A | 3/1996 | Dory et al. | 367/34 |
| 5,638,337 A | 6/1997 | Priest | 367/27 |
| 5,640,371 A | 6/1997 | Schmidt et al. | 367/153 |
| 6,173,793 B1 | 1/2001 | Thompson et al. | 175/45 |
| 6,247,542 B1 | 6/2001 | Kruspe et al. | 175/40 |
| 6,348,796 B2 | 2/2002 | Evans et al. | 324/374 |
| 6,353,322 B1 * | 3/2002 | Tabarovsky et al. | 324/366 |
| 6,600,321 B2 | 7/2003 | Evans | 324/369 |
| 6,714,014 B2 | 3/2004 | Evans et al. | 324/374 |
| 6,769,497 B2 | 8/2004 | Dubinsky et al. | 175/27 |
| 6,801,032 B2 | 10/2004 | Miyamoto | 324/324 |
| 2002/0093879 A1 | 7/2002 | Mandal | 367/27 |
| 2003/0222651 A1 | 12/2003 | Tabanou | 324/367 |
| 2005/0056461 A1 | 3/2005 | Estes et al. | 175/45 |
| 2005/0098350 A1 | 5/2005 | Eppink et al. | 175/26 |
| 2005/0133263 A1 | 6/2005 | Burrows et al. | 175/45 |
| 2005/0134280 A1 | 6/2005 | Bittar et al. | 324/367 |
| 2005/0189143 A1 | 9/2005 | Cole | 175/26 |
| 2005/0194184 A1 | 9/2005 | Gleitman | 175/45 |
| 2005/0194185 A1 | 9/2005 | Gleitman | 175/45 |
| 2008/0183392 A1* | 7/2008 | Forgang | 702/12 |

FOREIGN PATENT DOCUMENTS

CA    685727    5/1960

* cited by examiner

*Primary Examiner*—Reena Aurora
(74) *Attorney, Agent, or Firm*—Mossman Kumar & Tyler PC

(57) ABSTRACT

The average current at a plurality of measure electrodes of a resistivity imaging tool is determined and subtracted from the individual measure currents to give a resistivity image with improved dynamic range.

25 Claims, 5 Drawing Sheets

METHOD AND APPARATUS FOR ENHANCING FORMATION RESISTIVITY IMAGES OBTAINED WITH DOWNHOLE GALVANIC TOOLS

BACKGROUND OF THE INVENTION

1. Field of the Invention

This invention generally relates to explorations for hydrocarbons involving investigations of regions of an earth formation that may be penetrated by a borehole. More specifically, the invention deals with the problem of accurate digital representation of analog signals measured by sensors in the earth formation for subsequent processing. An example is discussed in some detail of highly localized borehole investigations employing the introduction and measuring of individual focused survey currents injected toward the wall of a borehole with a tool moved along the borehole.

2. Background of the Art

Electrical earth borehole logging is well known and various devices and various techniques have been described for this purpose. In an electrical investigation of a borehole, current from an electrode is introduced in the formation from a tool inside the borehole. There are two modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated.

Techniques for investigating the earth formation with arrays of measuring electrodes have been discussed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. The Baker patent teaches a plurality of electrodes, each of which is formed of buttons which are electrically joined by flexible wires with buttons and wires embedded in the surface of a collapsible tube. The Mann patent teaches an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described. The Gianzero patent discloses a pad mounted device, each pad having a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. U.S. Pat. No. 6,348,796 to Evans et al., having the same assignee as the present invention and the contents of which are fully incorporated herein by reference, discloses a pad mounted resistivity device in which the electrodes are non-overlapping. U.S. Pat. No. 6,714,014 to Evans et al. having the same assignee as the present invention and the contents of which are fully incorporated herein by reference, discloses a pad mounted resistivity device discloses a resistivity imaging device that uses capacitive coupling and may be used with oil based mud.

The devices described in the two Evans patents and in Gianzero may be referred to as a "two-electrode" system comprising the measure electrode and the pad. One of the problems with "two-electrode" imaging tools is a lack of resolution to resistivity inhomogeneities in front of the pad's buttons. The reason for this phenomenon could be easily seen from FIG. 3 that shows simplified paths for the current $I_n$ entering the button. The mandrel of the tool is denoted by 34 and two exemplary resistivity electrodes 41a and 41n are shown on a pad 55. The current in each of the electrodes is determined by the overall impedance $R_i$ that has been affected by the leakage impedance RL between the electrode and the return, the impedance of the fluid between the electrode $R_{fl}$ and the formation, the background formation impedance RF as well as the local variation of the formation resistivity $\Delta RF$—the desired signal.

$$Ri = \frac{RL \cdot (R_{fl} + RF + \Delta RF)}{RL + R_{fl} + RF + \Delta RF}, \quad (1)$$

The impedance $R_{fl}$ can be quite small in the presence of large standoff resulting in a quite significant leakage currents $IL_i$. This measurement situation could lead to the pad response as demonstrated on the FIG. 4a. Shown in FIG. 4a is a measured signal 101 plotted as a function of electrode number n. The measured signal 101 includes a large background signal and a small imaging signal component. The desired signal could be either poorly digitized if there is not enough dynamic range of the analog to digital converter used in the system, or could even by clipped to the full scale level 103. It should be noticed that in known tools the above-mentioned problem can not be recovered by automatic gain control, or in post-processing.

The problem of the two-electrode system of typical of many that are encountered in the evaluation of earth formations. In general terms, a plurality of sensors make measurements of a parameter of interest of the earth formation. The signals associated with each of the sensors may be characterized as the sum of a background signal and a differential signal. The differential signal varies from one sensor to another and is characteristic of local variations in the parameter of interest. The signals at the sensors are analog measurements. In situations where the background signal is much greater than the differential signal, it is desirable to improve the dynamic range of the difference signals when the output of the sensors is part of a digital data processing system The present invention addresses this problem.

SUMMARY OF THE INVENTION

One embodiment of the invention is an apparatus used to sense a property of a subterranean region. The apparatus includes a plurality of sensors, each sensor having an associated signal indicative of a property of the region, and circuitry which provides a difference between a signal from at least one of the sensors and a combined signal derived from one or more of the sensors. The circuitry may include analog circuitry. Circuitry may also be used which combines signals from more than one sensor to give the combined signal. The apparatus may include a processor which produces an image of a wall of the borehole from the difference. The subterranean region comprises at least one of (i) a formation matrix, (ii) a formation fluid, and (iii) a borehole fluid. The sensor may be acoustic sensors, resistivity sensor, nuclear sensor and/or NMR sensors. A digital to analog converter may digitize the difference. The sensor may include measure electrodes and the associated signals may be measure signals. If so, an additional electrode may be provided with a potential substantially the same as that of the measure electrode. A conveyance device may be used for conveying apparatus into a borehole in the subterranean region. The conveyance device may be a wireline, a slickline and/or a drilling tubular. An orientation sensor may be included in the apparatus. The circuitry may be on a bottomhole assembly and one or more of the plurality of sensor may be a virtual sensor defined by rotation of the bottomhole assembly. The sensor may be installed in a first borehole and a source of energy may be positioned in a second borehole spaced apart from the first borehole. The source of energy may be an acoustic source and/or an electromagnetic source.

Another embodiment of the invention is a method of evaluating subterranean region. A plurality of signals indicative of a property of the subterranean region are acquired and a difference between at least one of the signals and a combined signal derived from a plurality of the signals is provided. The difference may be provided using analog circuitry. An image of a wall of a borehole in the subterranean region may be produced. The method may involve digitizing the difference signal. The signals may be acquired by acoustic sensors, resistivity sensors, NMR sensor and/or nuclear sensors. The sensors may be conveyed in a borehole using a slickline, a wireline or a drilling tubular. At least one of the sensors may be a virtual sensor defined by rotation of the sensors. The signals may be acquired in a first borehole and may be the result of activation of a source of energy in a second borehole spaced apart from the first borehole. The source may be an acoustic source and/or an electromagnetic source.

Another embodiment of the invention is computer readable medium for use with an apparatus used in a subterranean region. The includes one or more sensors, each sensor having an associated signal indicative of a property of the region, and includes circuitry which provides a difference between at least one of the signals and a combined signal derived from a plurality of associated signals. The medium includes instructions which enable a processor to determine a parameter of interest of subterranean region from the difference. The medium may be a ROM, an EPROM, an EAROM, a Flash Memory, and/or an Optical disk.

BRIEF DESCRIPTION OF THE FIGURES

The present invention is best understood with reference to the accompanying figures in which like numerals refer to like elements and in which.

DETAILED DESCRIPTION OF THE INVENTION

Figure 1:
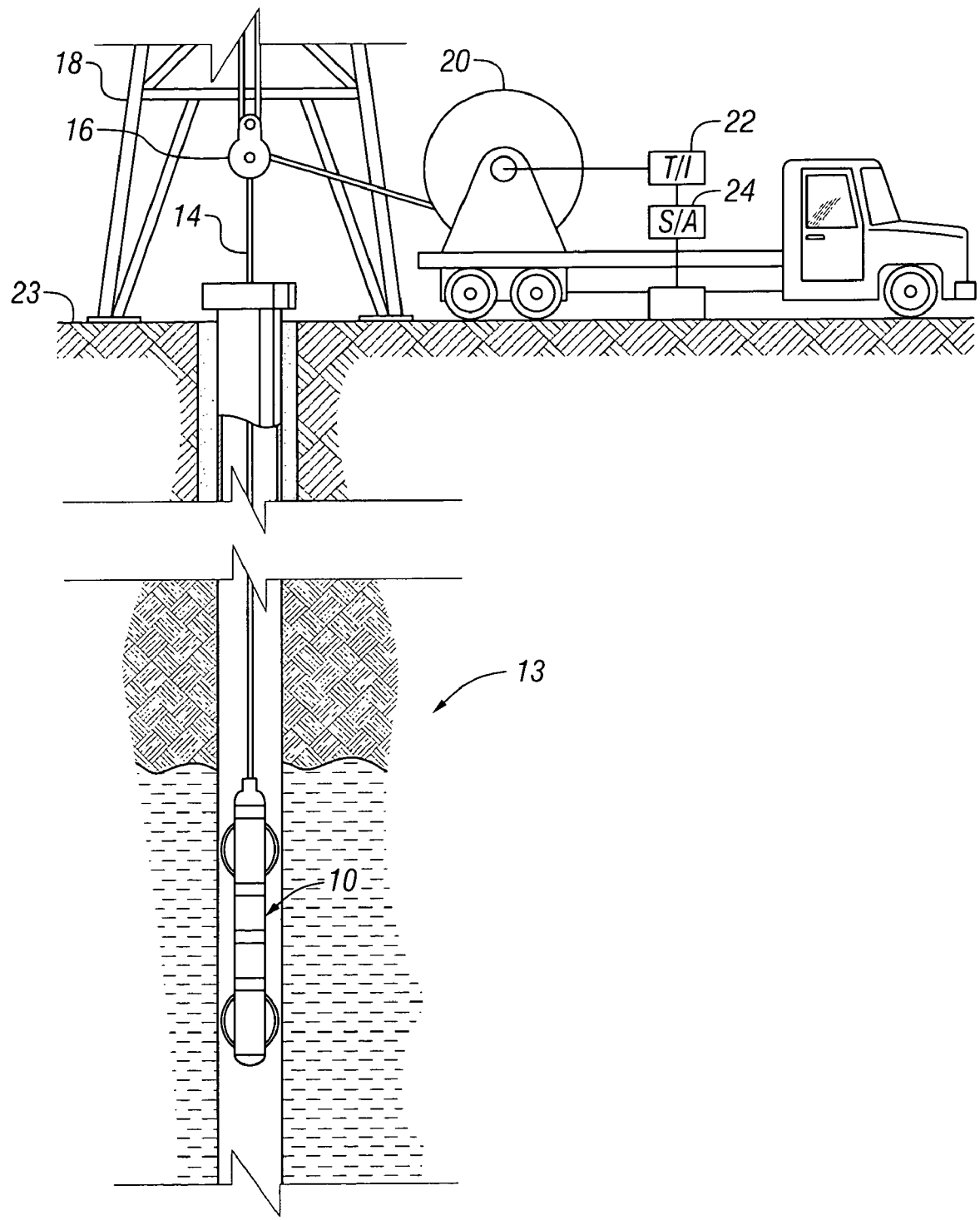
FIG. 1 (prior art) shows the imaging tool of this invention suspended in a borehole.

FIG. 1 shows an imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. Some of the data processing may also be done by a downhole computer.

Figures 2A, 2B:
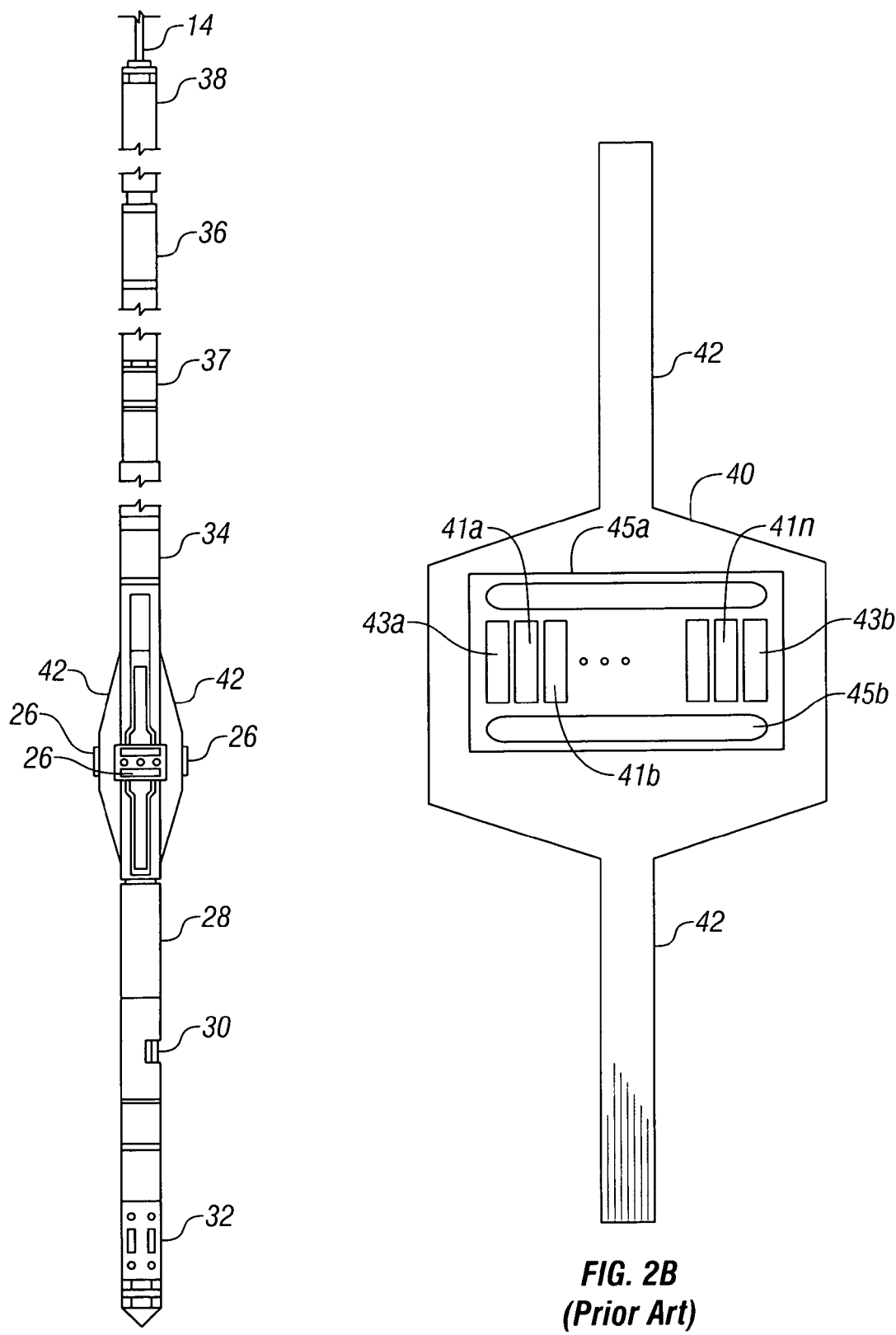
FIG. 2*a* (prior art) is a mechanical schematic view of an imaging tool using the present invention.
FIG. 2*b* (prior art) is a detail view of an exemplary electrode pad.
Figure 3:
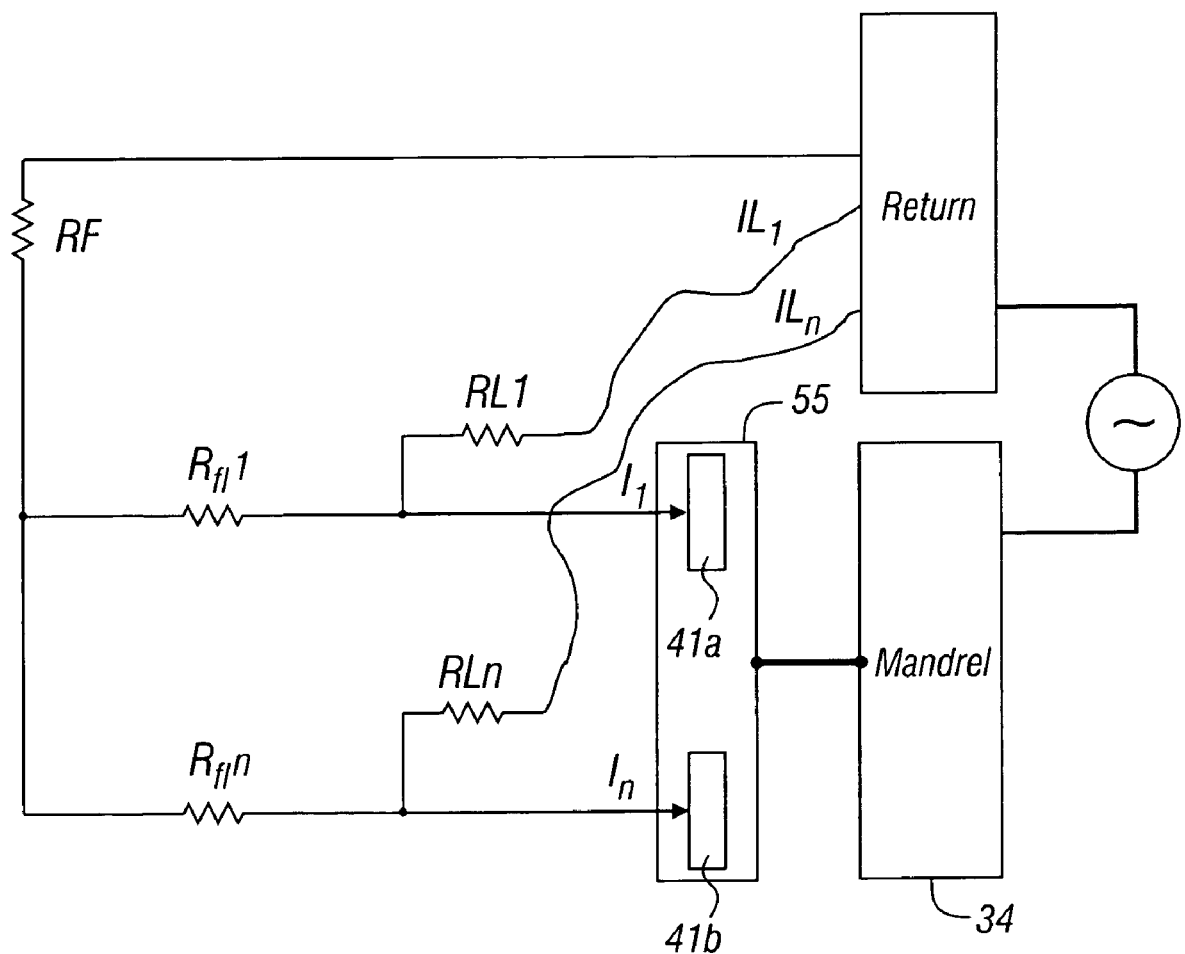
FIG. 3 is a schematic circuit diagram illustrating the leakage current and the background resistivity.

FIG. 2*a* is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Also shown in FIG. 2*a* are three resistivity arrays 26 (a fourth array is hidden in this view. Referring to FIGS. 2*a* and 2*b*, each array includes measure electrodes 41*a*, 41*b*, . . . 41*n* for injecting electrical currents into the formation, focusing electrodes 43*a*, 43*b* for horizontal focusing of the electrical currents from the measure electrodes and focusing electrodes 45*a*, 45*b* for vertical focusing of the electrical currents from the measure electrodes. By convention, "vertical" refers to the direction along the axis of the borehole and "horizontal" refers to a plane perpendicular to the vertical. The method of the present invention may also be used with tools that do not have the focusing electrodes.

Other embodiments of the invention may be used in measurement-while-drilling (MWD), logging-while-drilling (LWD) or logging-while-tripping (LWT) operations. The sensor assembly may be used on a substantially non-rotating pad as taught in U.S. Pat. No. 6,173,793 having the sane assignee as the present application and the contents of which are fully incorporated herein by reference. The sensor assembly may also be used on a non-rotating sleeve, such as that disclosed in U.S. Pat. No. 6,247,542, the contents of which are fully incorporated here by reference. A slickline implementation of the invention is also possible in which the sensor assembly is conveyed downhole on a slickline, the data recorded on a suitable memory device, and retrieved for subsequent processing.

Figure 5:
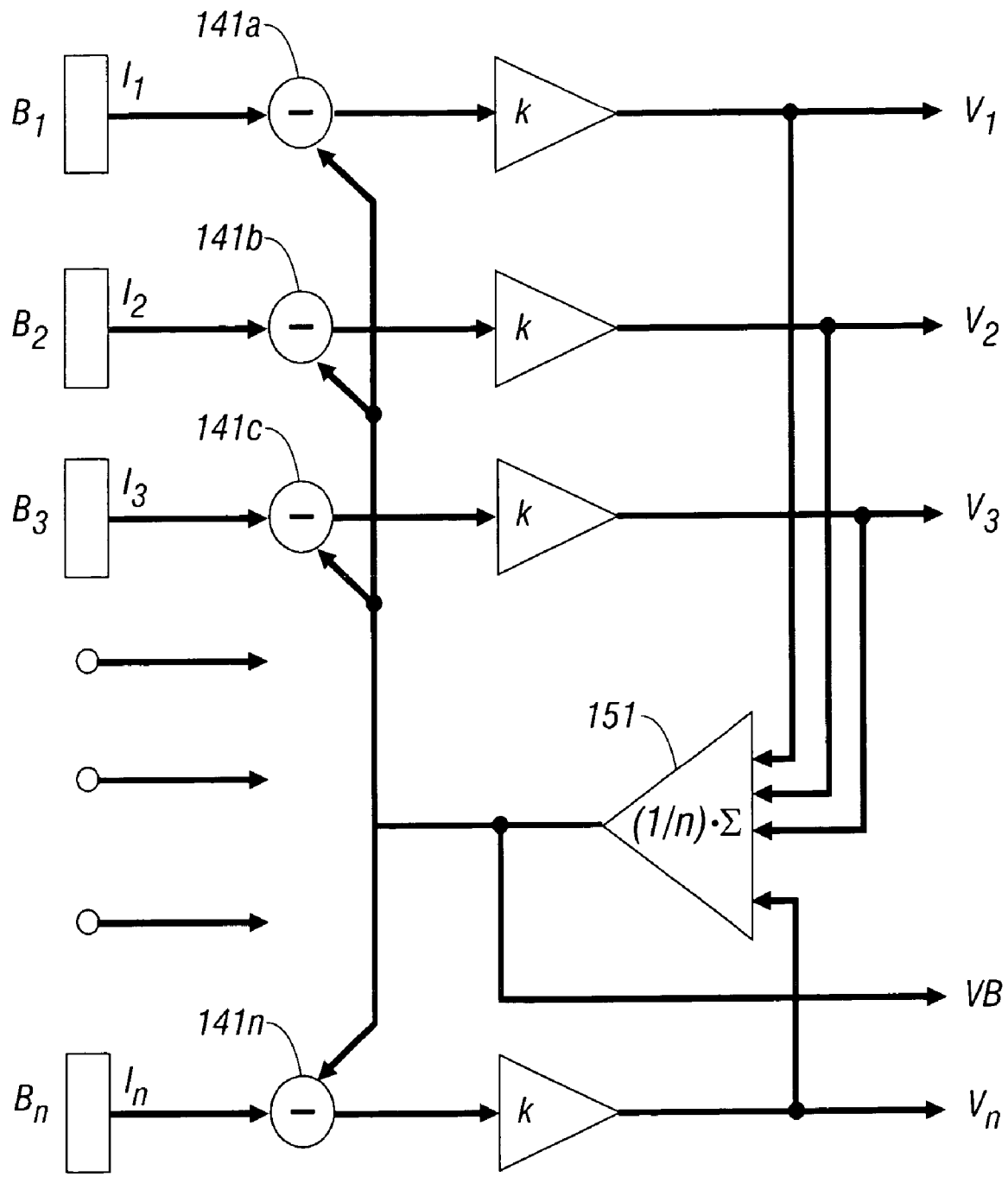
FIG. 5 is a circuit diagram an exemplary feedback circuitry for implementation of the present invention.

As noted above, the measured signal is dominated by the effects of the background formation impedance $R_f$, the effects of fluid impedance $R_{fl}$ and the leakage currents $IL_i$. The present invention is based on recognition of the fact that $R_f$, $R_{fl}$ and the leakage currents are slowly varying quantities with respect to the spatial electrode position. An adaptive feed back is implemented in the front-end part of the pad, i.e., prior to digitization. This is illustrated with reference to FIG. 5. The buffered current outputs $V_1, V_2, V_3 \ldots V_n$ of the electrodes 41a, 41b, 41c . . . 41n are averaged by the averaging amplifier 151 and the output of the averaging amplifier VB is used as a negative bias to the differential amplifiers 141a, 141b, 141c . . . 141n, the other input to the differential amplifiers being the corresponding measured currents $I_1, I_2, I_3 \ldots I_n$ from the button electrodes. The output of the averaging amplifier 151 is also may also be used for further processing, saved for subsequent retrieval, or telemetered uphole as an indication of the background formation resistivity. The filtered outputs of the button electrodes $V_1, V_2, V_3 \ldots V_n$, provide a high resolution image of the formation resistivity that has an improved dynamic range over the raw measurements, and are digitized using standard methods. The image is indicative of local heterogeneities of the borehole wall. The average may be added back to the digitized filtered outputs to provide an indication of absolute formation resistivity.

Figure 4A:
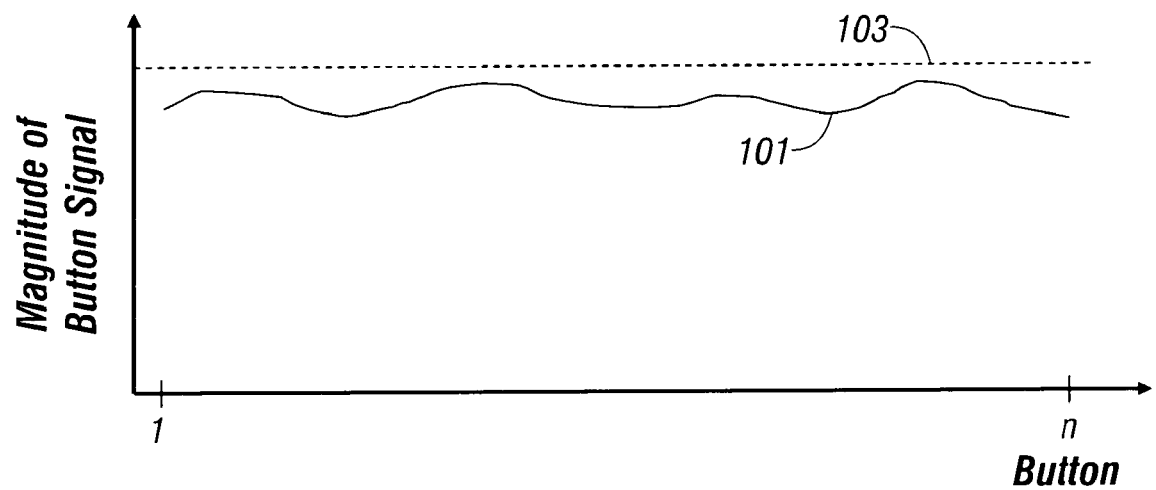
FIG. 4*a* illustrates the result of leakage current and the background resistivity on the outputs of the individual electrodes.
Figure 4B:
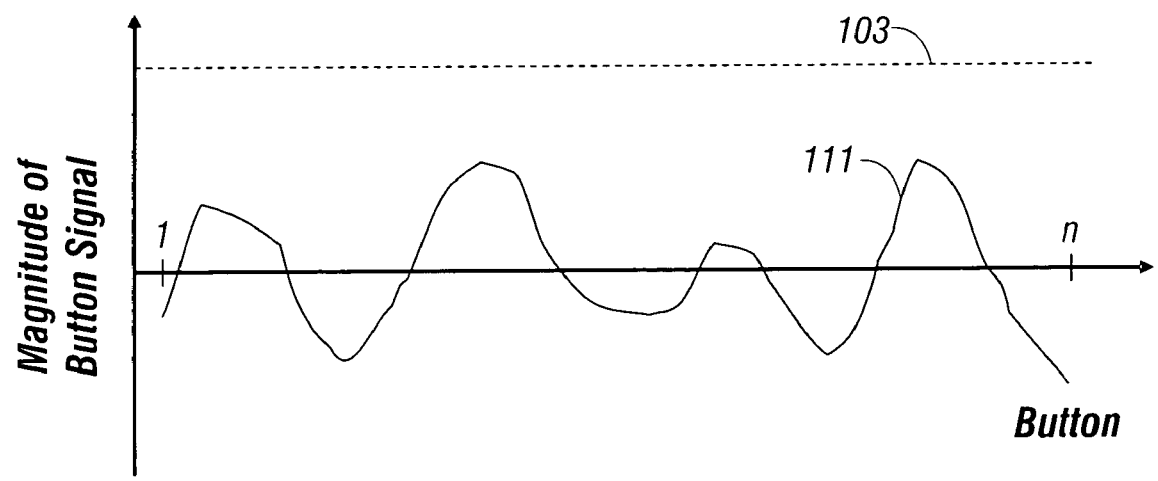
FIG. 4*b* shows the result of using the method of the present invention on the outputs of the individual electrodes.

Turning now to FIG. 4b, the signal 101' shows the result of using the front end feedback processing of the output 101 of the electrodes. The differences between the electrodes are enhanced: these differences are indicative of inhomogeneities in the resistivity of the borehole wall. The dynamic range is larger than in FIG. 4a.

In general terms, the measure electrodes constitute sensors and the measure currents are measurements associated with the measure electrodes. The analog circuitry combines the measure currents by averaging them. A difference between the averaged current and the individual measure currents forms a useful output of the system. It should be noted that the method described above could also be used with other sensor arrangements, including those without focusing electrodes or pads. U.S. Pat. No. 6,801,039 to Fabris et al., having the same assignee as the present invention and the contents of which are incorporated herein by reference, teaches the use of a defocused electrode system that is used for determination of the resistivity of borehole fluids.

The apparatus and method described above may be used with water-based mud (WBM) as well as with oil-based mud (OBM). For OBM, capacitive coupling of the electrical signals is used using, for example, the teachings of U.S. Pat. No. 6,714,014 to Evans et al., having the same assignee as the present invention and the contents of which are incorporated herein by reference. As discussed in Evans '014, the current is a modulated high frequency current that capacitively couples the electrical source on the logging tool to the formation.

The problem of a large background signal is also encountered in other situations such as secondary recovery operations. The objective is to monitor the flow of hydrocarbons in a reservoir between an injection well and a production well. Seismic or electromagnetic sources are positioned in one borehole and a plurality of detectors are typically installed in a second well. The passage of energy from the sources is affected by the relative distribution of fluids in the reservoir. What is of interest are differences between the received signal at the different receivers. The feedback circuitry discussed above may be used to enhance the desired signal in the presence of the large background signal (the bulk properties of the earth formation between the source and the receiver).

Yet another example is in the borehole televiewer in which an acoustic source inside a borehole is used to obtain an image of the borehole wall. The use of an acoustic device to determine borehole geometry and tool standoff is disclosed in U.S. Pat. No. 5,638,337 to Priest. U.S. Pat. No. 4,463,378 to Rambow displays both the amplitude and time of acoustic reflections from a borehole televiewer. While the times (and hence the borehole geometry) are relatively insensitive to the fluid in the borehole, the amplitude may be greatly affected by the attenuation of the acoustic signals within the borehole fluid. This attenuation provides a strong background signal that must be removed in order to make a meaningful interpretation of the signal amplitude. The method described above may be used for the purpose. While the device of Priest would need to use the concept of virtual sensor described above, the use of acoustic arrays for imaging of borehole walls is disclosed in U.S. Pat. No. 5,640,371 to Schmidt et al., the contents of which are incorporated herein by reference.

The method of the present invention is a general method that is applicable to array measurements indicative of properties of a subterranean region. The basic concept is that individual measurements are normalized by subtracting a composite signal derived from other elements of the array. This includes NMR measurements of spin echo properties of earth formation made by NMR sensors, nuclear measurements such as gamma ray measurements indicative of formation density and neron measurements indicative of formation porosity. The term subterranean region is indtended to include earth formations, the rock matrix, fluids in the rock matrix as well as boreholes in earth formations.

The apparatus and method has been described above using a wireline implementation as an example. The present invention can also be implemented for MWD applications. An example of resistivity imaging for MWD is discussed in U.S. Pat. No. 6,600,321 to Evans, having the same assignee as the present invention and the contents of which are fully incorporated herein by reference.

Alternatively, for MWD applications, an arrangement such as that described in U.S. patent application Ser. No. 10/616, 857 of Chemali et. al, having the same assignee as the present invention and the contents of which are incorporated herein by reference, may be used. Chemali does not require an array of electrodes: instead, a single electrode may be used. In the context of the present invention, the measurement made by the single electrode at a plurality of rotational angles and a plurality of depths define a virtual array of measure electrodes, measurements of which can be processed digitally using the same principles as the analog feedback filtering described above. The array of measurements may thus The implementation using a single electrode requires the use of an orientation sensor such as a magnetometer, and accurate estimates of depth as drilling progresses. The depth estimates may be made using, for example, the method disclosed in U.S. Pat. No. 6,769,497 to Dubinsky et al., having the same assignee as the present invention and the contents of which are incorporated herein by reference.

The operation of the transmitters and receivers may be done by a downhole processor and/or a surface processor. Implicit in the control and processing of the data is the use of a computer program on a suitable machine readable medium that enables the processor to perform the control and processing. The processing may include, for example, producing a resistivity image of the wall of the borehole using the filtered signals from the measure electrodes. The machine readable medium may include ROMs, EPROMs, EAROMs, Flash Memories and Optical disks. The term "processor" as used herein is intended to include Field Programmable Gate Arrays (FPGAs).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus used to sense a property of a subterranean region, the apparatus comprising:
    (a) a plurality of sensors, each sensor configured to produce a signal indicative of the property of the subterranean region; and
    (b) circuitry configured to provide an output signal for each of the plurality of sensors, each of the output signals comprising a difference between a signal from each of the plurality of sensors and a combined signal derived from the plurality of sensors.

2. The apparatus of claim 1 wherein the circuitry comprises analog circuitry.

3. The apparatus of claim 1 further comprising circuitry configured to combine signals from the plurality of sensors to give the combined signal.

4. The apparatus of claim 1 further comprising a processor configured to produce an image of the formation from the output signal for each of the plurality of sensors.

5. The apparatus of claim 1 wherein the subterranean region comprises at least one of (i) a formation matrix, (ii) a formation fluid, and (iii) a borehole fluid.

6. The apparatus of claim 1 wherein the plurality of sensors is selected from the group consisting of (i) an acoustic sensor, (ii) a resistivity sensor, (iii) a nuclear sensor, and (iv) an NMR sensor.

7. The apparatus of claim 1 further comprising a digital to analog converter which is configured to digitize the difference.

8. The apparatus of claim 1 wherein the plurality of sensors comprise measure electrodes and the signal produced by each of the plurality sensors comprises a measure current.

9. The apparatus of claim 8 further comprising an additional electrode configured to have a potential substantially equal to a potential of a measure electrode.

10. The apparatus of claim 1 further comprising a conveyance device configured to convey the apparatus into a borehole in the subterranean region, the conveyance device selected from the group consisting of (i) a wireline, (ii) a slickline, and (iii) a drilling tubular.

11. The apparatus of claim 10 further comprising an orientation sensor configured to make an orientation measurement.

12. The apparatus of claim 10 wherein the circuitry is on a bottomhole assembly (BHA) and wherein at least one of the plurality of sensors is a virtual sensor defined by rotation of the BHA.

13. The apparatus of claim 1 wherein the plurality of sensors are installed in a first borehole.

14. The apparatus of claim 13 wherein the plurality of sensors are conveyed in a first borehole, the apparatus further comprising a source of energy positioned in a second borehole spaced apart from the first borehole.

15. The apparatus of claim 14 wherein the source is selected from the group consisting of (i) an acoustic source, and (ii) an electromagnetic source.

16. The method of claim 14 wherein the plurality of signals comprise measure currents indicative of a resistivity of the subterranean region.

17. The method of claim 14 wherein acquiring the plurality of signals further comprises using sensors conveyed on a conveyance device selected from (i) a wireline, (ii) a slickline, and (iii) a drilling tubular.

18. The method of claim 17 further comprising defining at least one of the plurality of sensors as a virtual sensor defined by rotation of the sensors.

19. A method of evaluating a subterranean region, the method comprising:
    (a) acquiring a plurality of signals indicative of a property of the subterranean region; and
    (b) using downhole circuitry for providing a difference between each of the signals and a combined signal derived from the plurality of signals.

20. The method of claim 19 wherein providing the difference comprises using analog circuitry.

21. The method of claim 19 further comprising producing an image of a wall of a borehole in the subterranean region.

22. The method of claim 19 further comprising digitizing the difference.

23. The method of claim 19 further comprising obtaining the plurality of signals using sensors selected from the group consisting of (i) acoustic sensors, (ii) resistivity sensors, (iii) nuclear sensors, and (iv) NMR sensors.

24. The method of claim 19 wherein the plurality of signals are acquired in a first borehole, the signals resulting from activation of a source of energy positioned in a second borehole spaced apart from the first borehole.

25. The method of claim 24 wherein the source is selected from the group consisting of (i) an acoustic source, and (ii) an electromagnetic source.

* * * * *